United States Patent [19]
Anderson et al.

[11] Patent Number: 6,095,188
[45] Date of Patent: Aug. 1, 2000

[54] SOLENOID VALVE

[75] Inventors: David L. Anderson, Muskegon; David A. Dzioba, Swartz Creek, both of Mich.

[73] Assignee: SPX Corporation, Muskegon, Mich.

[21] Appl. No.: 09/321,232

[22] Filed: May 27, 1999

Related U.S. Application Data

[62] Division of application No. 08/963,455, Nov. 3, 1997, Pat. No. 5,950,984.

[51] Int. Cl.$^7$ ................................................. F15B 13/044
[52] U.S. Cl. ................................ 137/596.17; 251/129.14
[58] Field of Search .................. 139/596.17; 251/129.14

[56] References Cited

U.S. PATENT DOCUMENTS

| | | | |
|---|---|---|---|
| 4,063,568 | 12/1977 | Sosulnikov et al. | 137/270 |
| 4,391,292 | 7/1983 | Millar | 137/596.17 X |
| 4,570,904 | 2/1986 | Mullally | 251/129.21 |
| 4,578,662 | 3/1986 | Slavin et al. | 335/262 |
| 4,595,035 | 6/1986 | Warrick | 137/625.65 |
| 4,610,267 | 9/1986 | Beck et al. | 251/129.14 X |
| 4,674,536 | 6/1987 | Warrick | 137/614.19 |
| 4,863,142 | 9/1989 | Hendrixon et al. | 251/129.14 X |
| 4,997,004 | 3/1991 | Barkhimer | 137/596.17 |
| 5,000,420 | 3/1991 | Hendeixon et al. | 251/129.08 |
| 5,018,431 | 5/1991 | Gray et al. | 91/363 |
| 5,051,631 | 9/1991 | Anderson | 310/14 |
| 5,075,584 | 12/1991 | Hendrixon et al. | 310/14 |
| 5,076,323 | 12/1991 | Schudt | 137/596.17 |
| 5,104,091 | 4/1992 | Rathay et al. | 251/129.14 |
| 5,143,345 | 9/1992 | Miki et al. | 251/129.02 |
| 5,160,116 | 11/1992 | Sugiura et al. | 251/129.14 |
| 5,269,490 | 12/1993 | Fujikawa et al. | 251/129.15 |
| 5,567,023 | 10/1996 | Yoo | 303/119.2 |
| 5,606,992 | 3/1997 | Erickson et al. | 137/596.17 |

FOREIGN PATENT DOCUMENTS

| | | | |
|---|---|---|---|
| 2951232 | 7/1981 | Germany | 137/596.17 |
| 543767 | 10/1955 | Italy . | |
| 8103687 | 12/1981 | WIPO . | |

*Primary Examiner*—Gerald A. Michalsky
*Attorney, Agent, or Firm*—Reising, Ethington, Barnes, Kisselle, Learman & McCulloch, P.C.

[57] ABSTRACT

A normally closed, three-way valve comprises a housing having a supply passage, a control passage, and an exhaust passage. A valve assembly controls communication between the passages. The valve assembly includes a valve in the supply passage to open and close communication between the supply and control passages. The valve assembly also includes a second valve in the exhaust passage to open and close communication between the control and exhaust passages. The supply passage valve is normally held closed by the pressure of hydraulic fluid in the supply passage. A solenoid, when activated, moves the exhaust passage valve to closed position. A pintle between the two valves is shifted in one direction by the closing of the exhaust passage valve to open the supply passage valve against the pressure of fluid in the supply passage. The pintle is shifted in the opposite direction by the supply passage valve when the solenoid is de-activated, to move the exhaust passage valve to its open position. A spring in the supply passage acts on the supply passage valve in the open position thereof and during an initial portion only of its movement toward the closed position to assist the fluid pressure in the supply passage in moving that valve to the closed position. The spring is loosely captured between the supply passage valve and a stop in the supply passage so that it does not act on the supply passage valve when it is closed. Hence, the supply passage valve is held closed solely by the pressure of fluid in the supply passage.

7 Claims, 2 Drawing Sheets

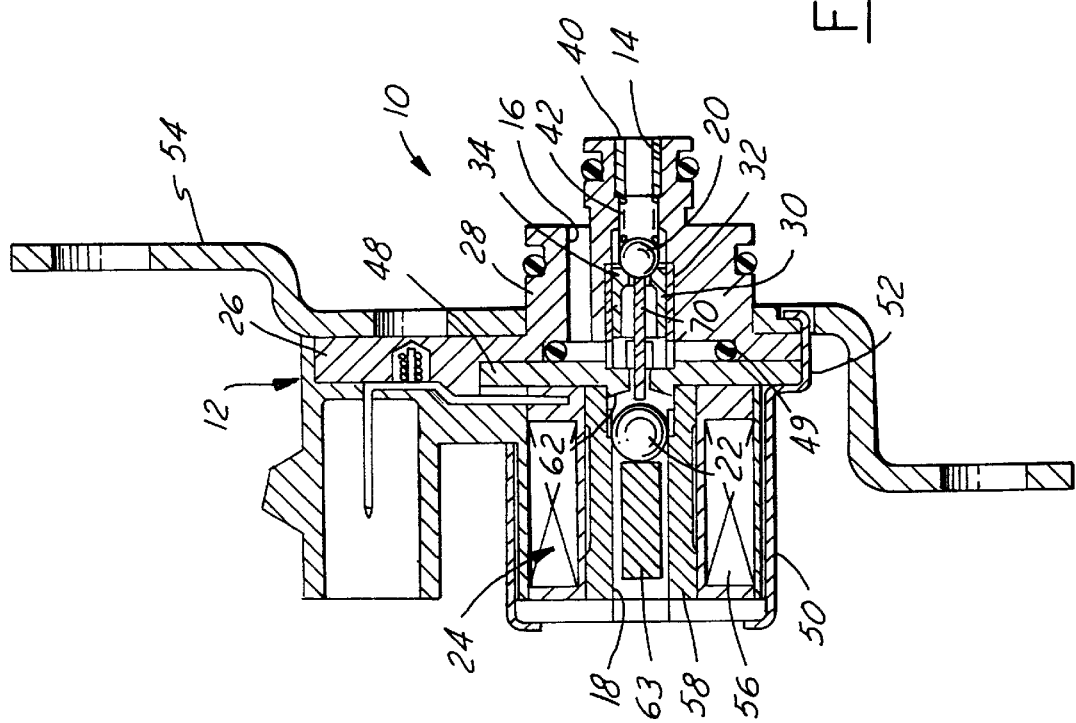
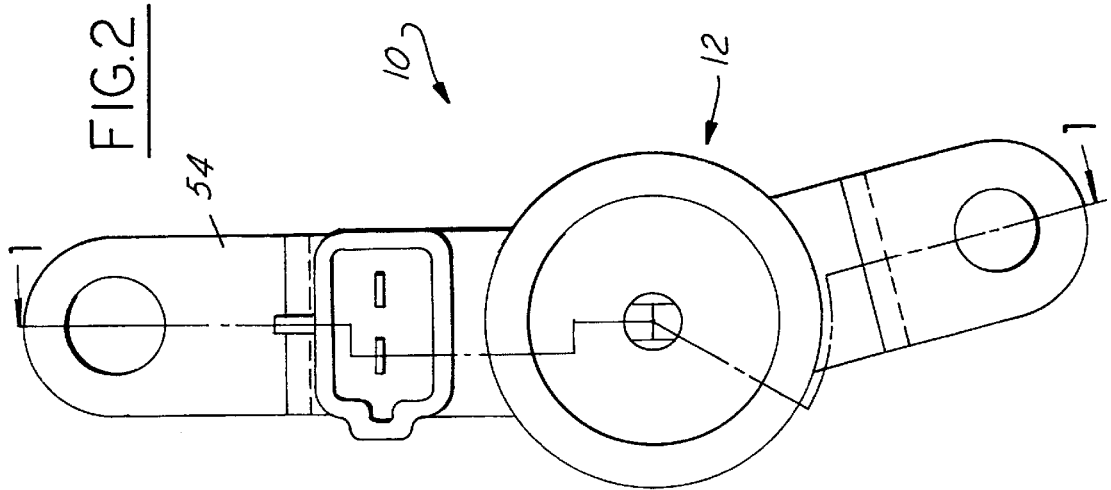

6,095,188

SOLENOID VALVE

This application is a division of application No. Ser. 08/963,455, filed Nov. 3, 1997, now U.S. Pat. No. 5,950,984 issued Sept. 14, 1999.

FIELD OF INVENTION

This invention relates generally to valves and more particularly to a normally closed, three-port solenoid valve.

BACKGROUND AND SUMMARY OF THE INVENTION

Typical normally closed solenoid valves have a biasing spring to seat a ball valve and thereby close the supply port when the solenoid is not energized. Thus, in order to open this valve, it is necessary for the solenoid to exert sufficient force on the ball to overcome the force of the spring.

In the solenoid valve of this invention, the ball valve for the supply port is held closed solely by the fluid pressure at the supply port. A spring is provided, but the spring does not engage the ball valve until after it is opened. When the current in the solenoid is interrupted, the fluid pressure in the supply passage, together with the force of the spring, return the ball to its seat.

In accordance with a specific embodiment of the invention about to be described, the valve housing has a supply passage, a control passage and an exhaust passage. A valve for the supply passage is provided to open and close communication between the supply passage and the control passage. This valve is normally held closed by the pressure of fluid in the supply passage. A valve for the exhaust passage controls communication between the control passage and the exhaust passage. A pintle is provided between the two valves. When the valve for the supply passage is closed, the pintle opens the valve for the exhaust passage, thereby opening communication between the control and exhaust passages. Energization of the solenoid closes the exhaust passage valve. This shifts the pintle which unseats the supply passage valve against the pressure of fluid in the supply passage.

In the preferred embodiment, the armature for the solenoid serves as the exhaust passage valve.

Preferably, the spring in the supply passage is a compression coil spring which is loosely captured between the supply passage valve and a stop in the supply passage. This valve, when seated, is spaced from the stop a distance which exceeds the length of the coil spring in its natural, free-state condition.

One object of this invention is to provide a solenoid valve having the foregoing features and capabilities.

Another object is to provide a solenoid valve which is constructed of a relatively few simple parts, is rugged and durable in use, and is capable of being inexpensively manufactured and assembled.

These and other objects, features and advantages of the invention will become more apparent as the following description proceeds, especially when considered with the accompanying drawings wherein:

BRIEF DESCRIPTION OF THE DRAWINGS

FIG. 1 is a sectional view of a solenoid valve embodying the invention, taken on the line 1—1 in FIG. 2.

FIG. 2 is an elevational view of the solenoid valve.

DETAILED DESCRIPTION OF THE PREFERRED EMBODIMENT

Figure 3:
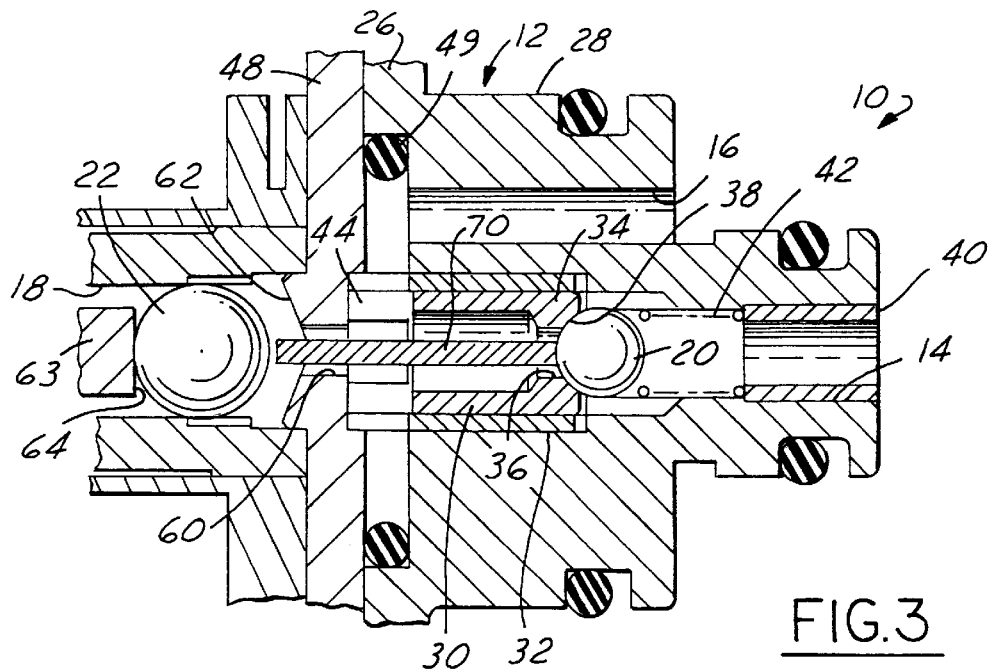
FIG. 3 is an enlargement of FIG. 1 showing the valve in its normally closed position, that is, with the valve for the supply passage closed and the valve for the exhaust passage open.

Referring now more particularly to the drawings, the solenoid valve 10 comprises a housing 12 having a supply passage 14, a control passage 16, and an exhaust passage 18. A ball valve 20 is provided for the supply passage and a ball valve 22 is provided for the exhaust passage. A solenoid 24 is supported in the housing.

The housing includes a plate 26 having a snout 28. The supply passage 14 and control passage 16 are formed in the snout. A tubular inlet seat 30 is supported with a press fit in a sleeve 32 secured in a counterbore extension of the supply passage in the snout. The inlet seat 30 has an end wall 34 formed with a central supply port 36 which is surrounded by a concave seat 38 against which the ball valve 20 seats to close the port 36. A tubular set screw 40 is threaded into the supply passage 14. A compression coil spring 42 extends lengthwise within the supply passage 14 and is loosely captured between the set screw and the ball valve 20. When the ball valve 20 is seated, the distance between the ball valve and the set screw exceeds the length of the coil spring 42 in its natural, free-state condition.

The port 36 in the inlet seat 30 leads to a chamber 44 in the housing defined by a recess in the snout in a cooperation with a seat washer plate 48.

The chamber 44 communicates with the control passage 16. An O-ring 49 seals this chamber.

The housing 10 also includes a frame 50 for supporting the solenoid 24. The frame 50 has a channel 52 at one end for clamping the plate 26 to the seat washer plate 48 and for securing the housing to a support bracket 54.

The solenoid 24 includes a coil 56 surrounded by a tubular center pole 58. The ball valve 22 is also the armature of the solenoid.

The seat washer plate 48 has a central exhaust port 60 surrounded by a concave exhaust seat 62 against which the ball valve 22 seats to close the exhaust port. A stop 63 is affixed to the center pole and has an abutment face 64 spaced from the seat 62 a distance greater than the diameter of the ball valve 22.

An elongated pin or pintle 70 extends through the ports 36 and 60 across the chamber 44. The pintle is aligned with the ball valves 20 and 22 and its ends are engageable with the balls. The pintle establishes a minimum spacing of the ball valves 20 and 22 such that both ball valves cannot engage the respective seats 38 and 62 at the same time.

In the de-energized state of the solenoid valve 10, the valve is normally closed so that the pressure of hydraulic fluid in the supply passage 14 holds the ball 20 seated against the inlet seat 38, thereby closing the supply passage and preventing; hydraulic fluid in the supply passage from flowing to the control passage 16. At this time, the pintle 70 is moved by the ball valve 20 to the left and lifts ball valve 22 off its seat. In this condition, the control passage 16 is open to the exhaust passage 18, allowing return flow of hydraulic fluid to relieve downstream pressure. The ball stop 63 is set in a position that provides additional clearance beyond pintle travel and thus the ball 22 may not actually be in contact with the pintle during reverse flow (See FIG. 3).

Figure 4:
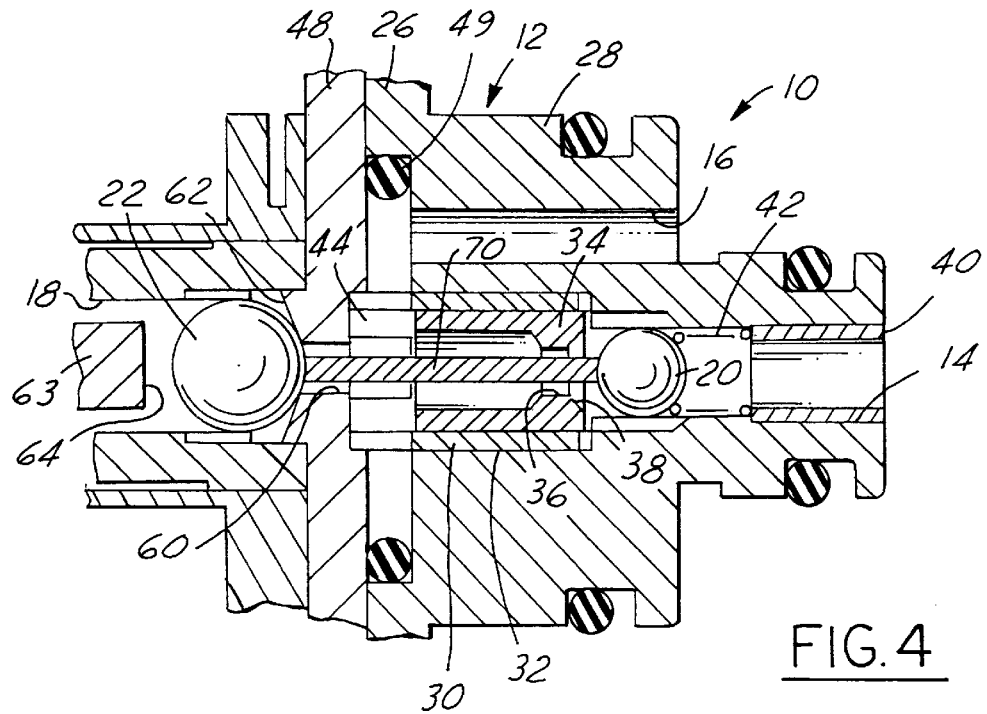
FIG. 4 is a view similar to FIG. 3, but shows the valve for the supply passage open and the valve for the exhaust passage closed.

In the energized state when voltage is applied to the solenoid, the magnetic flux created pulls the ball 22 against the exhaust seat 62, closing off the exhaust passage 18. The pintle 70 is in contact with both ball valves 20 and 22 and as the pintle 70 follows the movement of the ball 22 to the right (See FIG. 4), it urges the ball 20 off its seat. Supply of hydraulic fluid is thus allowed to pass from the supply passage 14 to the control passage 16 to operate a desired intrumentality.

When the ball 20 moves off the inlet seat, it is not initially in contact with the spring 42. Thus, the solenoid does not need to overcome spring pressure to unseat the ball 20. However, further movement of the ball 22 to its fully seated position causes additional movement of the pintle 70 to the right and actual contact and compression of the spring by the ball 20. Thus, the spring in combination with hydraulic pressure in the supply passage, assures a rapid return of the ball 20 to its seated condition on seat 38 when the solenoid is de-energized. The spring 42 is compressed for only approximately half of the travel of the ball valve 20 to provide more efficient acceleration of the ball-pintle-ball combination back to the de-energized position in which the ball 20 is seated and the ball 22 is unseated.

Adjustments and calibration may be accomplished easily. The ball travel, or armature air gap adjustment, is made by pushing on the ball 20 to the left, which pushes on the inlet seat 30 which preferably has a 0.0005"–0.0025" interference fit with the sleeve 32. As the ball 20, inlet seat 30 and pintle 70 move farther into the sleeve 32, the pintle urges the ball 22 off its seat a predetermined amount. The ball stop 63 is installed in a position that allows a clearance preferably oil the order of about 0.001"–0.008" over the pintle travel.

The device is calibrated to provide a specific control pressure at a specific duty cycle, by adjusting the spring load on spring 42 with the set screw 40.

In the preferred embodiment of the invention, pintle 70 is physically unattached to balls 20,22. However, the pintle may be attached to one of the balls, such as by being press fitted into an opening in the one ball. This modification can be used to adjust the effective length of the pintle.

What is claimed:

1. Normally closed, three-way valve structure comprising
 a valve housing,
 said housing having a supply passage for fluid under pressure entering said housing, a control passage, and an exhaust passage,
 a valve assembly for controlling communication between said supply passage and said control passage and between said control passage and said exhaust passage,
 said valve assembly comprising a first valve in said supply passage movable between open and closed positions to open and close communication between said supply and control passages,
 said valve assembly comprising a second valve movable between open and closed positions to open and close communication between said control and exhaust passages,
 said first valve normally being held in a closed position by the pressure of fluid in said supply passage,
 control means operative, when activated, to move said second valve to the closed position thereof, and
 a pintle between said first and second valves,
 said pintle being shifted in one direction by said second valve, when the latter is moved to the closed position thereof in response to activation of said control means, to move said first valve to the open position thereof against the pressure of fluid in said supply passage,
 said pintle being shifted in the opposite direction by said first valve when said control means is de-activated, to move said second valve to the open position thereof,
 said valve assembly further comprising spring means applying force on said first valve in the open position thereof and during an initial portion only of its movement toward the closed position thereof to assist the fluid pressure in said supply passage in causing the initial movement of said first valve toward the closed position thereof,
 a stop in said supply passage,
 said spring means comprising a compression coil spring loosely captured between said first valve and said stop,
 said first valve, when in the closed position thereof, being spaced from said stop a distance which exceeds the length of the coil spring in the uncompressed natural, free-state condition of the latter, whereby said first valve is completely relieved of the force of said spring means when said first valve is in the closed position thereof.

2. Valve structure as defined in claim 1, wherein said valve assembly includes an inlet seat engaged by said first valve in the closed position thereof, and an exhaust seat engaged by said second valve in the closed position thereof.

3. Valve structure as defined in claim 2, wherein said inlet seat and said exhaust seat are spaced apart, and said pintle extends through aligned openings in said seats and has ends engageable with the respective first and second valves.

4. Valve structure as defined in claim 3, wherein said first valve is a first ball and said second valve is a second ball.

5. Valve structure as defined in claim 4, wherein said control means comprises a solenoid having a coil and an armature, and wherein said second ball is the armature.

6. Valve structure as defined in claim 5, wherein said pintle is unattached to said first and second balls.

7. Valve structure as defined in claim 6 wherein said armature is movable upon activation and de-activation of said solenoid in opposite directions toward and away from said second valve, and said pintle extends between said armature and said first valve through an opening in said inlet seat to unseat said first valve upon movement of said armature in said direction toward said second valve, and to unseat said second valve upon movement of said armature in said direction away from said second valve and movement of said first valve toward closed position thereof.

* * * * *